United States Patent Office 3,473,309
Patented Oct. 21, 1969

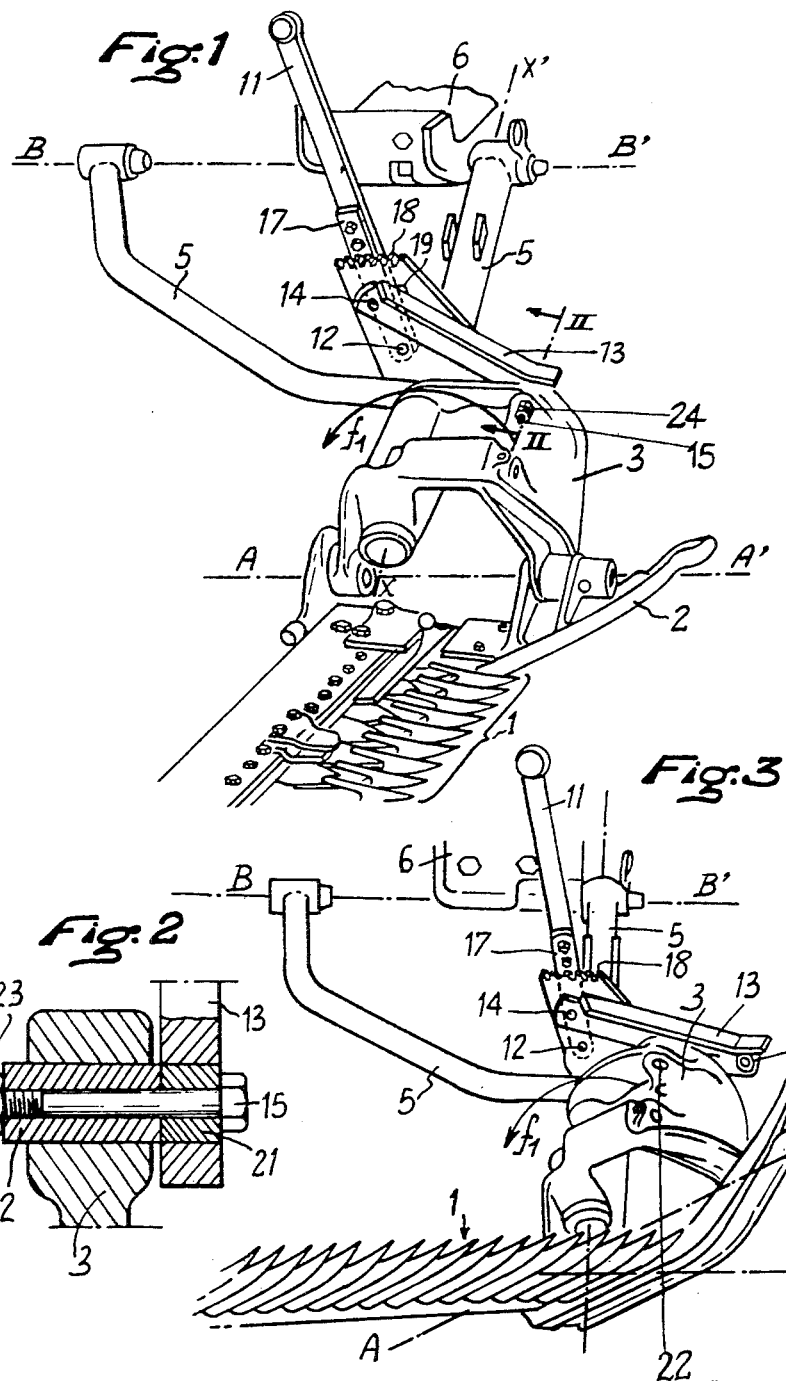

3,473,309
SAFETY SYSTEM FOR MOWERS
Jacques Eugeni Bouet, Tourcoing, France, assignor to International Harvester Company, Chicago, Ill., a corporation of Delaware
Filed Mar. 3, 1967, Ser. No. 621,006
Int. Cl. A01d 55/02, 75/18
U.S. Cl. 56—282                 3 Claims

ABSTRACT OF THE DISCLOSURE

A mower having a downwardly inclined coupling bar, a generally horizontal mower pivoted on the lower end of the coupling box, a releasable connection between the bar and mower adapted to separate when the mower strikes an obstruction whereupon the mower swings upwardly away from the obstruction on the axis of the coupling bar.

---

This invention is directed to a safety system whereby the cutter bar of a mower is permitted to swing backwards during work when it encounters an obstruction.

So far as concerns mowers which are mounted on the three-point hitch system at the rear end of a tractor, the problem to be solved is relatively simple. In this case, the entire mower including its drive unit pivots with respect to a fixed point of the support frame which is rigidly coupled to the tractor. The triangulation of the entire portion of the mower which is movable with respect to the frame is usually provided by an automatic telescopic trip rod which is set by means of a spring at a predetermined load in such a manner that said rod withstands the normal stresses which are met with while mowing but trips as soon as it is subjected to a distinctly higher stress such as is produced when the cutter bar strikes an obstruction. Under these conditions of tripping of the cutter bar, the driver is usually able to stop the tractor fairly quickly and consequently to prevent the mowing machine from being subjected to any stresses which might otherwise result in fracture or deformation of main components such as cutter bar proper, inner shoe, hinge or mower frame. It is apparent that the degree of safety afforded is correspondingly higher as the rearward travel of the cutter bar is greater. As a rule, the backward swing of the cutter bar is limited by the maximum angle through which power can be transmitted from the universal joint assembly of the mower drive shaft, namely between approximately 30 and 45°.

So far as concerns side-mounted mowers, namely mowers which are mounted between the front and rear wheels of tractors, the problem is frequently more difficult to solve, taking into account the type of drive system, the mounting points beneath the tractor and the possibilities of angular displacement of the mower between the wheels. Certain known forms of construction comprise either a telescopic trip rod which is located in front of the cutter bar and which is subjected to tensile stresses or alternatively a rod which is located behind the cutter bar and therefore subjected to compressive stresses. In both cases, the frame is provided with a double articulation which permits of vertical lifting motion and horizontal tripping motion. The horizontal tripping motion is usually very limited, either on account of possible interference between the inner shoe of the cutter bar and the corresponding rear tire (tyre) of the tractor or by reason of the fact that no provision is made for automatic release of the knife-operating mechanism and that the misalignment between the crank-plate and knife is accordingly absorbed by the bending movement of the pitman arm. Other forms of construction consist solely in producing a pivotal movement of the cutter bar at the level of the inner shoe, whereas the support frame in that case remains rigid.

Provision must therefore be made in all cases, in addition to those members which ensure the normal operation of the mower, for a system which produces the pivotal motion about a vertical axis, either of the support frame with respect to the tractor or of the cutter bar with respect to the frame, and for a trip system.

The invention is more especially concerned with mowers of the type in which the cutter bar is rigidly fixed to an inner shoe which is adapted to pivot about an axis at right angles to the general direction of the cutter bar on a hinge which is in turn pivoted on a coupling bar about an axis located at right angles to the preceding and extending transversely with respect to the direction of forward motion of the mower while being upwardly and outwardly inclined, said coupling bar being in turn pivotally mounted on the frame of the machine about a horizontal longitudinal axis whilst tilt-control means usually consisting of a hand-lever which is pivotally attached to the coupling bar and coupled to the pivotally mounted hinge or yoke by means of a link make it possible to adjust the angle of tilt of the inner shoe and leading edge of the cutter bar.

The object of the invention is to provide a safety system which permits the backward withdrawal of the cutter bar by putting to profitable use the members which couple the cutter bar to the mower frame.

To this end, in accordance with the invention, there is interposed in the tilt-control means a safety member which is capable of maintaining the cutter bar in the normal work position by means of the hinge and inner shoe but which is capable of yielding under the action of an unduly high stress to which said cutter bar may be accidentally subjected.

The safety member can be, for example, a shear bolt or alternatively a calibrated spring.

In an advantageous form of embodiment, the safety member consists of a shear bolt which constitutes at the same time the pivot pin of one of the two ends of the link which provides a coupling between the tilt-control lever and the yoke.

A better understanding of the invention will be gained from a perusal of the following description and from a study of the accompanying drawings in which one form of embodiment of a safety system for mowers according to the invention is shown by way of example and not in any limiting sense.

In these drawings:

FIGURE 1 shows in perspective the members for supporting and adjusting the cutter bar of a mowing machine in the work position;

FIGURE 2 is a partial sectional view on a larger scale, taken along the line II—II of FIGURE 1;

FIGURE 3 is a view which is similar to FIGURE 1 and which shows the complete assembly in the tripped position;

Figure 4:
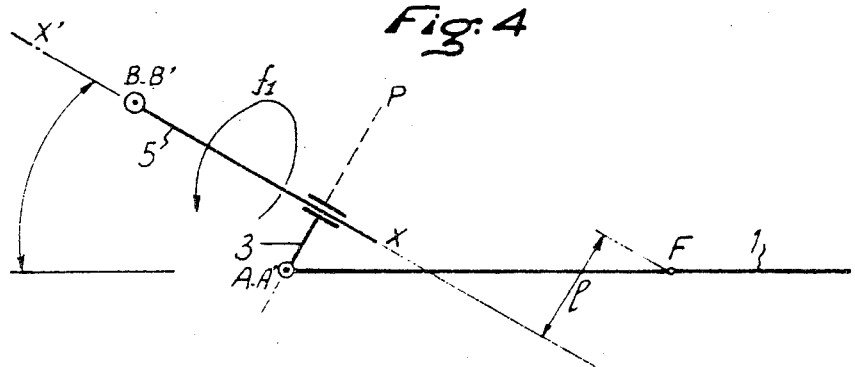
FIGURES 4 and 5 represent diagrammatically in elevation and in plan respectively, the kinematic chain of the main elements which are shown in FIGURE 1, that is to say in the work position.

The cutter bar 1 of the mower is fixed to an inner shoe 2 which is pivoted about a geometrical axis AA' located transversely to the general direction of the cutter bar 1 on a mounting yoke 3. Said yoke 3 is in turn pivoted about a geometrical axis XX' on a coupling bar assembly 5, the axis XX' being at right angles to the axis AA' which is located below it and extending upwardly and outwardly. The coupling bar assembly 5 is similarly adapted to pivot on a portion 6 which forms part of the tractor, about a horizontal longitudinal geometrical axis BB'.

Tilt adjustment of the inner shoe and cutter bar 1 can be effected by means of a system comprising an operating lever 11 which is pivotally mounted on the sector 18 by means of a pin 12, said pin being parallel to the axis XX' about which the mounting yoke 3 is pivoted on said coupling bar assembly. Said operating lever 11 is coupled to the yoke 3 by means of a tilt-control connecting link 13, one end of which is pivoted to the lever 11 by means of a pin 14 and the other end of which is pivoted to the hinge 3 by means of a pin 15.

A locking bolt 17 which is adapted to engage in the notches of a toothed sector 18 serves to secure the operating lever 11 in any desired position with respect to the coupling assembly 5. Said toothed sector 18 is integral with the coupling bar assembly 5 and its center is located on the axis of pin 12. In the example which is illustrated, the pin 14 which provides a pivotal coupling between the lever 11 and the pitman 13 traverses said toothed sector 18 through an arcuate slot 19, the center of which is also located on the axis 12.

Thus far, the specific description in this application has related to conventional arrangements. The present invention consists in incorporating with the cutter bar tilt-control system a safety member which, in the example shown, is constituted by the pin 15 by which the link 13 is pivoted to the yoke 3, said pin being designed in the form of a shear bolt (as also shown in FIG. 2). In order that the bolt should shear under good conditions as and when the cutter bar strikes an obstruction, said bolt is mounted in the end of the link 13 with interposition of a ring 21 of hardened steel and in the yoke 3 with interposition of a hardened steel bushing 22. The bolt 15 is held in position by means of a nut 23 and locknut 24.

The material and section of the bolt 15 are chosen so that said bolt has sufficient strength to maintain the cutter bar in the work position but has nevertheless sufficiently low strength to be capable of yielding in the event of unduly high stress transmitted to the cutter bar by any obstruction which may be located on its path, in accordance with the mode of operation which will now be described hereinafter.

Reference will accordingly be made to FIGURES 4 to 7.

Figure 5:
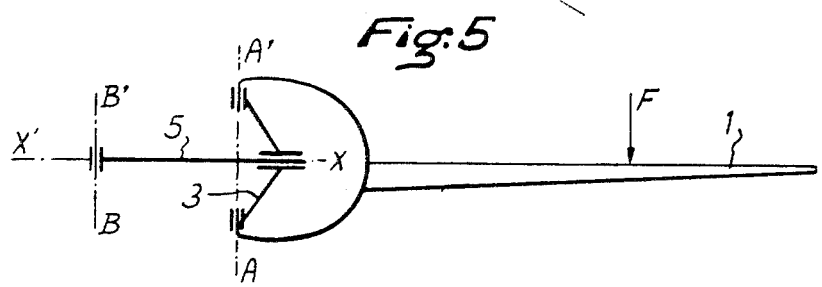
Figure 6:
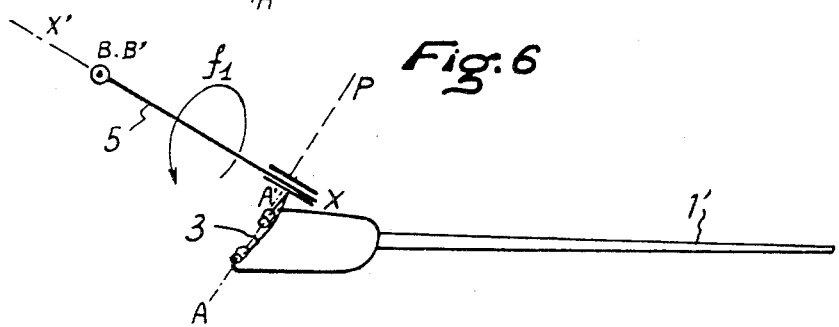
FIGURES 6 and 7 represent, also in elevation and in plan respectively, the same kinematic chain after tripping, that is to say in the position corresponding to FIGURE 3.

The constituent elements of the machine are all shown in FIGURES 4 to 5 in the normal mowing position. FIGURE 4 is an elevation view and FIGURE 5 is a plan view, in which there are again shown the cutter bar 1, the yoke 3, the coupling bar assembly 5 and the geometrical axes AA', BB' and XX'. During operation of the mower, a force F produces action on the cutter bar 1 and therefore subjects the yoke 3 to a torque about the axis XX', as shown by the arrow f1 in FIGURE 4. The value of said torque is the product of the force F and of the distance "l" between the line of application of said force and the axis XX'. However, during normal operation of the mower, the yoke 3 offers resistance to this pivotal motion under the action of the opposing resistance produced by the tilt control system formed by the link 13 and the operating lever 11 which is locked in position by the toothed sector 18.

Figure 7:
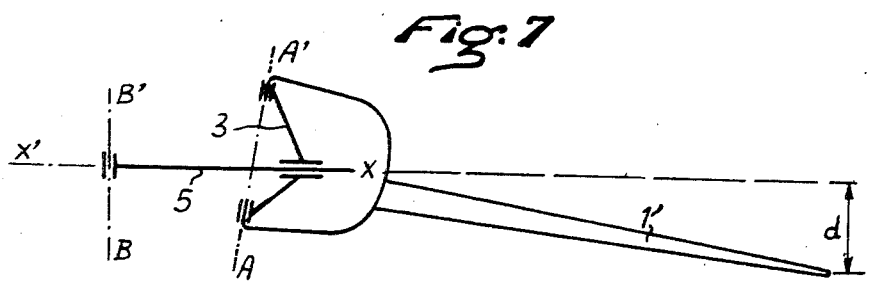

If the cutter bar should encounter an obstacle which sets up undue resistance, the force F assumes a value such that the torque exerted on the yoke 3 becomes sufficient to shear the bolt 15. The yoke 3 then pivots in the direction of the arrow f1 and takes up the position shown in FIGURES 6 and 7. The cutter bar 1 has thus moved from position 1 to position 1' (as shown in FIG. 7) and the extremity of the bar has accordingly moved over the distance "d." The value of this backward movement, which results solely from the pivotal motion of the yoke 3 in the direction of the arrow f1, is of relatively small amplitude but can continue simply by rotation of the cutter bar 1 and inner shoe 2 about the axis AA' which now no longer takes up a horizontal position as in the work position of FIGURES 4 and 5, but a position in which the leading edge of the cutter bar is raised.

As will be readily understood, the invention is not limited to the form of embodiment which has been described and illustrated and can be provided with any modifications without thereby departing either from the scope or the spirit of the invention.

Thus, it follows from the foregoing, for example, that:

The shear bolt could form the pin of the opposite end of the tilt control link 13, namely the pin which provides a pivotal coupling between said pitman and the operating lever 11.

The shear bolt could form part of the means for attaching the locking bolt 17 to the lever 11.

The shear bolt could be replaced by any equivalent member which is capable of yielding in response to a predetermined effort and, in particular, a calibrated spring interposed at any suitable point of the kinematic chain between the operating lever 11 and the yoke 3.

What we claim is:

1. A mower mounting comprising an inclined coupling bar assembly including an inclined axis, a substantially horizontally disposed sickle-bar mower extending laterally from said assembly, means pivotally connecting said mower to said assembly on said axis which converges in relation with the mower at an angle such that upon the mower striking an obstruction it will swing upwardly and rearwardly about said axis, and said connecting means including overload release structure.

2. The invention according to claim 1 and said structure comprising a shear element.

3. The invention according to claim 1 and said connecting means including manually operable tilt control structure.

References Cited

UNITED STATES PATENTS

| 52,264 | 1/1866 | Burkhart | 56—284 |
| 301,796 | 7/1884 | Bordwell | 56—281 |
| 472,654 | 4/1892 | Cooley | 56—282 |
| 497,816 | 5/1893 | Pridmore | 56—286 |
| 1,121,812 | 12/1914 | Dickel et al. | 56—287 |
| 1,240,361 | 9/1917 | Pearson | 56—285 |
| 1,404,431 | 1/1922 | Burgess | 56—273 |
| 1,855,838 | 4/1932 | Kranick | 56—25 |
| 1,947,552 | 2/1934 | Huddle | 56—25 |

RUSSELL R. KINSEY, Primary Examiner

U.S. Cl. X.R.

56—25